United States Patent
Kong et al.

(10) Patent No.: US 12,108,022 B2
(45) Date of Patent: Oct. 1, 2024

(54) METHOD FOR INFRARED SMALL TARGET DETECTION BASED ON DEPTH MAP IN COMPLEX SCENE

(71) Applicant: DALIAN UNIVERSITY OF TECHNOLOGY, Liaoning (CN)

(72) Inventors: Weiqiang Kong, Liaoning (CN); Deyun Lv, Liaoning (CN); Wei Zhong, Liaoning (CN); Risheng Liu, Liaoning (CN); Xin Fan, Liaoning (CN); Zhongxuan Luo, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 392 days.

(21) Appl. No.: 17/442,967

(22) PCT Filed: Mar. 5, 2020

(86) PCT No.: PCT/CN2020/077963
§ 371 (c)(1),
(2) Date: Sep. 24, 2021

(87) PCT Pub. No.: WO2021/138994
PCT Pub. Date: Jul. 15, 2021

(65) Prior Publication Data
US 2022/0174256 A1    Jun. 2, 2022

(30) Foreign Application Priority Data
Jan. 10, 2020    (CN) ........................ 202010027793.1

(51) Int. Cl.
*G06K 9/00*    (2022.01)
*G06T 7/155*    (2017.01)
(Continued)

(52) U.S. Cl.
CPC ........... *H04N 13/271* (2018.05); *G06T 7/155* (2017.01); *G06V 10/28* (2022.01); *G06T 2207/10048* (2013.01); *G06V 2201/07* (2022.01)

(58) Field of Classification Search
CPC .................. H04N 13/271; G06T 7/155; G06T 2207/10048; G06V 10/28; G06V 2201/07
See application file for complete search history.

(56) References Cited

U.S. PATENT DOCUMENTS

| 5,978,498 A | * | 11/1999 | Wilhelm | G06V 30/155 |
|---|---|---|---|---|
| | | | | 382/128 |
| 2003/0035507 A1 | * | 2/2003 | Hsu | G06T 7/11 |
| | | | | 378/4 |

FOREIGN PATENT DOCUMENTS

| CN | 104240240 A | * | 12/2014 |
|---|---|---|---|
| CN | 107452033 A | | 12/2017 |

(Continued)

*Primary Examiner* — Avinash Yentrapati
(74) *Attorney, Agent, or Firm* — Muncy, Geissler, Olds & Lowe, P.C.

(57) ABSTRACT

The present invention discloses a method for infrared small target detection based on a depth map in a complex scene, and belongs to the field of target detection. An infrared image is collected, the image is binarized by using priori knowledge of a to-be-detected target and adopting a pixel value method, the binary image is further limited based on deep priori knowledge, then static and dynamic scoring strategies are formulated to score a candidate connected component in the morphologically processed image, and an infrared small target in a complex scene is detected finally. The method can screen out targets within a specific range, has high reliability; has strong robustness; is simple in program and easy to implement, can be used in sea, land, and air, and has a significant advantage under a complex jungle background.

2 Claims, 2 Drawing Sheets

(51) Int. Cl.
*G06V 10/28* (2022.01)
*H04N 13/271* (2018.01)

(56) References Cited

FOREIGN PATENT DOCUMENTS

| | | | |
|---|---|---|---|
| CN | 109002777 | A | 12/2018 |
| CN | 109345472 | A | 2/2019 |
| CN | 110310362 | A | 10/2019 |
| JP | 5966935 | B2 | 8/2016 |

* cited by examiner

METHOD FOR INFRARED SMALL TARGET DETECTION BASED ON DEPTH MAP IN COMPLEX SCENE

TECHNICAL FIELD

The present invention belongs to the field of target detection, and particularly relates to a method for infrared small target detection based on a depth map in a complex scene.

BACKGROUND

In recent years, with the development of military and civilian detectors and infrared thermal imaging technologies, target detection based on infrared images has been widely used in unmanned reconnaissance, vehicle obstacle avoidance, battlefield monitoring and wildlife protection. However, most target detection algorithms may fail in extremely complex infrared scenes. Because of having a small imaging area, an infrared small target carries a small amount of information, the heat exchange between the target and the surrounding environment makes the target have low contrast and lack shape, texture and other information; the surrounding background often contains disturbance of an object (for example, branch, wall or the like) which is similar to the small target in feature, making it easy to be obliterated in the complex background; moreover, as the distance between the target and a detector changes, the size of the target may change, so that infrared small target detection in a complex scene becomes a difficult problem.

At present, the traditional infrared target detection algorithms are roughly divided into three types including frame difference algorithm, background difference algorithm and optical flow algorithm. The frame difference algorithm extracts a motion region through binarization segmentation based on the time difference of pixels, is not easily affected by illumination but is sensitive to environmental noise, the overlapping part of targets between adjacent frames cannot be detected, and a camera is required to be fixed. The background difference algorithm is also limited by the camera fixing condition and it is difficult to model and update the background because the change of external illumination, the change of weather and the movement of the background may cause the dynamic change of a background image. The optical flow algorithm estimates a motion field according to the temporal-spatial gradient of an image sequence, and detects a motion object by analyzing the change of the motion field, the detection precision is high but the calculation process is complicated, so the real-time operation needs to be improved. The mean shift algorithm can complete the detection process well in the case of edge blocking and uneven background motion, is a no-parameter estimation method that does not require priori knowledge, but needs to carry out iterative calculation on the characteristic quantity of each pixel value, is large in calculation amount, and is poor in timeliness and anti-noise performance.

SUMMARY

In order to solve the problems existing in the existing method, the present invention provides a method for infrared small target detection based on a depth map in a complex scene. The depth map refers to an image that takes the distance (depth) from an image sensor to each point in the scene as a pixel value, which directly reflects the geometry of a visible surface of an object in the scene. The method can detect static or dynamic infrared small targets in real time in an extremely complex scene by using depth map information and static and dynamic scoring strategies.

The technical solution of the present invention is as follows:

A method for infrared small target detection based on a depth map in a complex scene, comprising the following steps:

1) image acquisition: acquiring a single-frame or multi-frame infrared image I photographed by a binocular infrared camera and a corresponding depth map dis_I thereof;
2) image binarization: selecting a pixel value K with the maximum edge gradient a target, binarizing the image by using a pixel value method, obtaining a binary image Binary_I;
3) distance limitation: setting an estimated distance between the target and the infrared camera to d, corresponding a pixel point P(x,y) that is not within a distance range to the binary image Binary_I according to known depth information, Binary_I(x,y) being 0;
4) morphological processing: conducting morphological processing on the binary image including finding connected components, dilation and erosion, wherein the purpose of this step is to extract image information useful for expressing and depicting the shape of the target to be detected from the image;
5) formulation of static and dynamic scoring strategies: using static and dynamic features as decision-making items; ranking the static and dynamic features respectively according to a certain ranking strategy using a weighting scoring mechanism, and finally weighting to obtain scores of all connected components on the image;
6) target screening: screening single target or multiple targets according to the scores of all connected components.

In step 5), the specific process of formulation of static and dynamic scoring strategies includes:

5-1) According to the static features of the target, using rectangularity, aspect ratio, region gray value, variation coefficient of connected component gray value, and circularity as static features, formulating static scoring strategies, wherein the calculation formula of each static feature is:

$$\begin{cases} \text{Rectangularity}: J_k = \dfrac{S_k}{S_{rect}} \\ \text{Aspect ratio}: R_k = \dfrac{\text{width}_k}{\text{height}_k} \\ \text{Region gray value}: G_k = \sum_{i=1}^{N} I_i * w_i \\ \text{Variation coefficient}: V_k = \dfrac{\sqrt{\dfrac{\sum_{1}^{N}(I_i - I_{mean})^2}{N-1}}}{I_{mean}} * 100\% \\ \text{Circularity}: C_k = \dfrac{4\pi S_k}{L_k} \\ RankS_k = \alpha J_k + \beta R_k + \gamma G_k + \delta V_k + \varepsilon C_k \end{cases}$$

where $S_k$ represents the area of the $k^{th}$ connected component, $S_{rect}$ represents the area of the smallest external rectangle of the $k^{th}$ connected component, $\text{width}_k$ represents the width of the $k^{th}$ connected component, $\text{height}_k$ represents the height of the $k^{th}$ connected component, $I_i$ represents the pixel value of the pixel point I(x,y) in the connected component, $w_i$ represents the weight corresponding to the pixel value of the pixel point I(x,y), N represents the number of pixel points in the $k^{th}$ connected component, $I_{mean}$ represents the average gray value of the $k^{th}$ connected component, $I_{mean}=\Sigma_{i=1}^{N}I_i/N$, $Cl_k$ represents the circumference of the $k^{th}$ connected component, α, β, γ, δ and ε represent weights corresponding to the static features; $RankS_k$ represents a score of a static feature of the $k^{th}$ connected component.

5-2) According to dynamic features of the target, using area and distance as dynamic features, formulating dynamic scoring strategies.

Speed inequality Speed: $\theta_1 * speed_{min} \leq Speed_k \leq \theta_2 * speed_{max}$ Speed inequality Area: $\mu_1 * Area_{min} \leq Area_k \leq \mu_2 * Area_{max}$ $$RankD_k = \zeta Speed_k + \varphi Area_k$$

where $Speed_k$ represents the movement speed of the $k^{th}$ connected component, $speed_{min}$ represents the minimum known movement speed, $speed_{max}$ represents the maximum known movement speed, $Area_k$ represents the area of the $k^{th}$ connected component, $Area_{min}$ represents the minimum known connected component area, $Area_{max}$ represents the maximum known connected component area; $\Theta_1$, $\theta_2$ represent corresponding speed weights, $\mu_1$, $\mu_2$ represent corresponding area weights, $\zeta$, $\varphi$ represent weights corresponding to dynamic features, and $RankD_k$ represents a score of a dynamic feature of the $k^{th}$ connected component.

The present invention has the advantageous effects that: the present invention designs a method for infrared small target detection based on a depth map in a complex scene. Infrared small targets are detected by using depth map information and static and dynamic scoring strategies, and single target or multiple targets are screened according to scores. The method has the following characteristics: (1) the method can screen out targets within a specific range, has high reliability; (2) has strong robustness; (3) is simple in program and easy to implement, can be used in sea, land and air, and has significant advantage under a complex jungle background.

DETAILED DESCRIPTION

The present invention provides a method for infrared small target detection based on a depth map in a complex scene which realizes the detection of infrared small targets in a complex scene by means of four steps, that is, setting of binary threshold, distance limitation, morphological processing and formulation of static and dynamic scoring strategies. The present invention is further described below in combination with the drawings and the embodiments.

Figure 1:
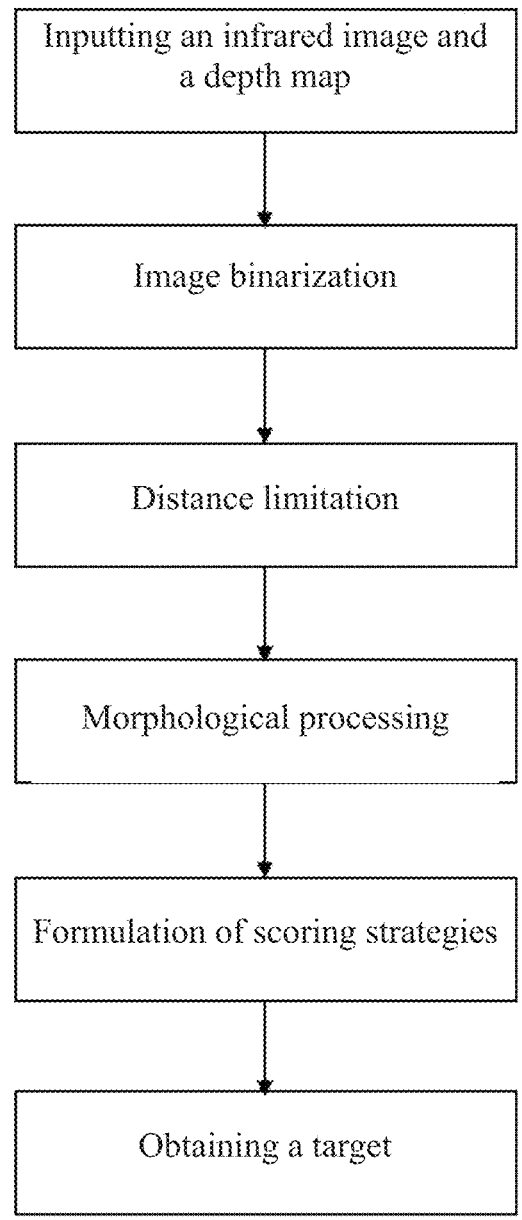
FIG. 1 is a master flow chart of a method for infrared small target detection based on a depth map in a complex scene.
Figure 2:
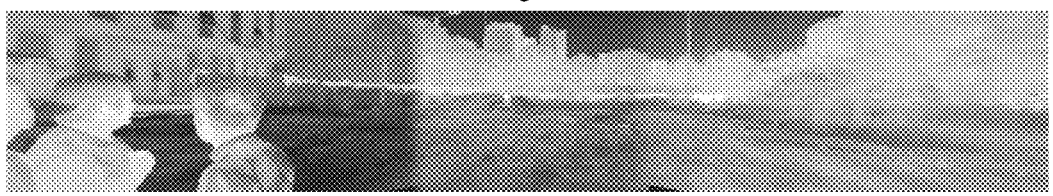
FIG. 2 shows a single-frame image of infrared small target detection based on a depth map in a complex scene.
Figure 3:
FIG. 3 shows a target to be detected after being partially enlarged in FIG. 2.

As shown in FIG. 1, a method tier infrared small target detection based on a depth map in a complex scene, comprising the following steps:

1) acquiring single-frame or a multi-frame infrared image I photographed by a binocular infrared camera and a corresponding depth map dis_I thereof, wherein FIG. 2 shows a single-frame image of infrared small target detection based on a depth map in a complex scene;
2) FIG. 3 shows a target to be detected after being partially enlarged; selecting a pixel value K with the maximum edge gradient of a target, binarizing the image by using a pixel value method, setting a pixel value of which the value is less than K to 0 and setting a pixel value of which the value is greater than or equal to K to 255, obtaining a binary image Binary_I.
3) setting an estimated distance between the target and the infrared camera to d, corresponding a pixel point P(x,y) that is not within a distance range to the binary image Binary_I according to known depth information, Binary_I(x,y) being 0;
4) conducting morphological processing on the binary image Binary_I including finding connected components, dilation and erosion; setting an erosion structure element to SE1 and a dilation structure element to SE2; setting the maximum area of a connected component where the target to be detected is located to $Area_{max}$ and the minimum area to $Area_{min}$; if the area of the connected component is $Area_k$, k represents the serial number of the connected component, only retaining the connected component with $Area_{min} \leq Area_k \leq Area_{max}$;
5) formulation of static and dynamic scoring strategies: using static and dynamic features as decision-making items; ranking the static and dynamic features respectively according to a certain ranking strategy using a weighting scoring mechanism, and finally weighting to obtain scores of all connected components on the image;
6) screening single target or multiple targets according to scores.

In step 5), the specific process of formulation of static and dynamic scoring strategies includes:

5-1) According to the static features of the target, using rectangularity, aspect ratio, region gray value, variation coefficient of connected component gray value, and circularity as static features, formulating static scoring strategies, wherein the calculation formula of each static feature is:

$$\begin{cases} \text{Rectangularity}: J_k = \dfrac{S_k}{S_{rect}} \\ \text{Aspect ratio}: R_k = \dfrac{width_k}{height_k} \\ \text{Region gray value}: G_k = \sum_{i=1}^{N} I_i * w_i \\ \text{Variation coefficient}: V_k = \dfrac{\sqrt{\dfrac{\sum_{1}^{N}(I_i - I_{mean})^2}{N-1}}}{I_{mean}} * 100\% \\ \text{Circularity}: C_k = \dfrac{4\pi S_k}{L_k} \\ RankS_k = \alpha J_k + \beta R_k + \gamma G_k + \delta V_k + \varepsilon C_k \end{cases}$$

where $S_k$ represents the area of the $k^{th}$ connected component, $S_{rect}$ represents the area of the smallest external rectangle of the $k^{th}$ connected component, $width_k$ represents the width of the $k^{th}$ connected component, $height_k$ represents the height of the $k^{th}$ connected component, $I_i$ represents the pixel value of the pixel point I(x,y) in the connected component, $w_i$ represents the weight corresponding to the pixel value of the pixel point I(x,y), N represents the number of pixel points in the $k^{th}$ connected component, $I_{mean}$ represents the average gray value of the $k^{th}$ connected component, $I_{mean}=\Sigma_{i=1}^{N}I_i/N$, $L_k$ represents the circumference of the $k^{th}$ connected component, $\alpha$, $\beta$, $\gamma$, $\delta$ and $\varepsilon$ represent weights corresponding to the static features; $RankS_k$ represents a score of a static feature of the $k^{th}$ connected component.

5-2) According to dynamic features of the target, using area and distance as dynamic features, formulating dynamic scoring strategies:

$$\begin{cases} \text{Speed inequality Speed: } \theta_1 * \text{speed}_{min} \leq \text{Speed}_k \leq \theta_2 * \text{speed}_{max} \\ \text{Speed inequality Area: } \mu_1 * \text{Area}_{min} \leq \text{Area}_k \leq \mu_2 * \text{Area}_{max} \\ RankD_k = \zeta \text{Speed}_k + \varphi \text{Area}_k \end{cases}$$

where $\text{Speed}_k$ represents the movement speed of the $k^{th}$ connected component, $\text{speed}_{min}$ represents the minimum known movement speed, $\text{speed}_{max}$ represents the maximum known movement speed, $\text{Area}_k$ represents the area of the connected component, $\text{Area}_{min}$ represents the minimum known connected component area, $\text{Area}_{max}$ represents the maximum known connected component area; $\theta_1$, $\theta_2$ represent corresponding speed weights, $\mu_1$, $\mu_2$ represent corresponding area weights, $\zeta$, $\varphi$ represent weights corresponding to dynamic features, and $RankD_k$ represents a score of a dynamic feature of the $k^{th}$ connected component.

Those skilled in the art can easily understand that the above only describes preferred embodiments of the present invention and is not intended to limit the present invention. Any modification, equivalent replacement, improvement, etc. made within the spirit and the principle of the present invention shall be contained within the protection scope of the present invention.

The invention claimed is:

1. A method for infrared small target detection based on a depth map in a complex scene, comprising the following steps:
   1) image acquisition: acquiring a single-frame or multi-frame infrared image I photographed by a binocular infrared camera and a corresponding depth map dis_I thereof;
   2) image binarization: selecting a pixel value K with the maximum edge gradient of a target, binarizing the image by using a pixel value method, obtaining a binary image Binary_I;
   3) distance limitation: defining an estimated distance between the target and the infrared camera to be d, then identifying a corresponding pixel point P(x,y) in the estimated distance; according to a known depth information, when the corresponding pixel point P(x,y) falling outside the estimated distance corresponds to the binary image Binary_I, value at Binary_I(x,y) is 0;
   4) morphological processing: conducting morphological processing on the binary image including finding connected components, dilation and erosion, wherein the purpose of this step is to extract image information useful for expressing and depicting the shape of the target to be detected from the image;
   5) formulation of static and dynamic scoring strategies: using static and dynamic features as decision-making items; ranking the static and dynamic features respectively according to a certain ranking strategy using a weighting scoring mechanism, and finally weighting to obtain scores of all connected components on the image;
   6) target screening: screening single target or multiple targets according to the scores of all connected components.

2. The method for infrared small target detection based on a depth map in a complex scene according to claim 1, characterized in that in step 5), the specific process of formulation of static and dynamic scoring strategies includes:
   5-1) according to the static features of the target, using rectangularity, aspect ratio, region gray value, variation coefficient of connected component gray value, and circularity as static features, formulating static scoring strategies, wherein the calculation formula of each static feature is:

$$\begin{cases} \text{Rectangularity}: J_k = \dfrac{S_k}{S_{rect}} \\ \text{Aspect ratio}: R_k = \dfrac{\text{width}_k}{\text{height}_k} \\ \text{Region gray value}: G_k = \sum_{i=1}^{N} I_i * w_i \\ \text{Variation coefficient}: V_k = \dfrac{\sqrt{\dfrac{\sum_1^N (I_i - I_{mean})^2}{N-1}}}{I_{mean}} * 100\% \\ \text{Circularity}: C_k = \dfrac{4\pi S_k}{L_k} \\ RankS_k = \alpha J_k + \beta R_k + \gamma G_k + \delta V_k + \varepsilon C_k \end{cases}$$

where $S_k$ represents the area of the $k^{th}$ connected component, $S_{rect}$ represents the area of the smallest external rectangle of the $k^{th}$ connected component, width represents the width of the $k^{th}$ connected component, $\text{height}_k$ represents the height of the $k^{th}$ connected component, $I_i$ represents the pixel value of the pixel point I(x,y) in the connected component, w; represents the weight corresponding to the pixel value of the pixel point I(x,y), N represents the number of pixel points in the $k^{th}$ connected component, $I_{mean}$ represents the average gray value of the $k^{th}$ connected component, $I_{mean}=\Sigma_{i=1}^{N}I_i/N$, $L_k$ represents the circumference of the $k^{th}$ connected component, $\alpha$, $\beta$, $\gamma$, $\delta$ and $\varepsilon$ represent weights corresponding to the static features; $RankS_k$ represents a score of a static feature of the $k^{th}$ connected component;

5-2) according to dynamic features of the target, using area and distance as dynamic features, formulating dynamic scoring strategies:

$$\begin{cases} \text{Speed inequality Speed: } \theta_1 * \text{speed}_{min} \leq \text{Speed}_k \leq \theta_2 * \text{speed}_{max} \\ \text{Speed inequality Area: } \mu_1 * \text{Area}_{min} \leq \text{Area}_k \leq \mu_2 * \text{Area}_{max} \\ RankD_k = \zeta \text{Speed}_k + \varphi \text{Area}_k \end{cases}$$

where $\text{Speed}_k$ represents the movement speed of the $k^{th}$ connected component, $\text{speed}_{min}$ represents the minimum known movement speed, $\text{speed}_{max}$ represents the maximum known movement speed, $\text{Area}_k$ represents the area of the $k^{th}$ connected component, $\text{Area}_{min}$ represents the minimum known connected component area, $\text{Area}_{max}$ represents the maximum known connected component area; $\theta_1$, $\theta_2$ represent corresponding speed weights, $\mu_1$, $\mu_2$ represent corresponding area weights, $\zeta$, $\varphi$ represent weights corresponding to dynamic features, and $RankD_k$ represents a score of a dynamic feature of the $k^{th}$ connected component.

\* \* \* \* \*